United States Patent [19]

Arisaka

[11] Patent Number: 5,450,255
[45] Date of Patent: Sep. 12, 1995

[54] APPARATUS FOR SEARCHING A RECORDING MEDIUM OF AN ELECTRONIC STILL CAMERA

[75] Inventor: Akihiro Arisaka, Tokyo, Japan

[73] Assignee: Asahi Kogaku Kogyo Kabushiki Kaisha, Tokyo, Japan

[21] Appl. No.: 292,043

[22] Filed: Aug. 18, 1994

Related U.S. Application Data

[63] Continuation of Ser. No. 35,966, Mar. 23, 1993, abandoned.

[30] Foreign Application Priority Data

Mar. 25, 1992 [JP] Japan .................. 4-097368

[51] Int. Cl.6 .................. G11B 15/18; H04N 5/78
[52] U.S. Cl. .................. 360/72.1; 360/35.1; 358/335; 369/54
[58] Field of Search .................. 360/35.1, 69, 78.04, 360/74.1, 72.1, 31, 60, 33.1; 358/906, 335; 348/232; 369/32, 54, 58

[56] References Cited

U.S. PATENT DOCUMENTS

| | | | |
|---|---|---|---|
| 4,689,699 | 8/1987 | Harigaya et al. | 360/74.4 |
| 4,758,913 | 7/1988 | Saltzman et al. | 360/72.1 |
| 4,792,869 | 12/1988 | Fujita | 360/69 |
| 4,819,093 | 8/1989 | Okada et al. | 360/78.06 |
| 4,825,324 | 4/1989 | Miyake et al. | 360/35.1 |
| 4,847,708 | 7/1989 | Furuyama | 369/32 |
| 4,951,276 | 8/1990 | Sakaegi et al. | 369/58 |
| 4,967,294 | 10/1990 | Kaneko et al. | 360/78.04 |
| 5,005,088 | 4/1991 | Fukushima et al. | 360/69 |
| 5,016,124 | 5/1991 | Fukushima et al. | 360/69 |
| 5,051,849 | 9/1991 | Fukushima et al. | 360/69 |
| 5,053,898 | 10/1991 | Hashimoto et al. | 360/72.1 |
| 5,072,317 | 12/1991 | Fukushima et al. | 360/71 |
| 5,227,927 | 7/1993 | Fukushima et al. | 360/69 |

FOREIGN PATENT DOCUMENTS

| | | |
|---|---|---|
| 3603906 | 8/1986 | Germany . |
| 3809398 | 10/1989 | Germany . |
| 61-107583 | 5/1986 | Japan . |
| 63-140454 | 6/1988 | Japan . |

OTHER PUBLICATIONS

Patent Abstracts of Japan, vol. 12, No. 399 (P-775), Oct. 24, 1988.

*Primary Examiner*—Andrew L. Sniezek
*Attorney, Agent, or Firm*—Sandler, Greenblum & Bernstein

[57] ABSTRACT

An apparatus for searching a recording medium of an electronic still camera to determine a record state of a plurality of recording tracks of the recording medium. Electric signals are recorded on the recording medium in accordance with an actuation of a record starting button. The searching apparatus includes a record state detector which detects whether electric signals are recorded on respective recording tracks of a recording medium. The detected record states of the respective recording tracks are stored in a memory. A release detector detects the operation of a shutter switch, while a vacant track retrieving device suspends the operation of the record state detector and retrieves a vacant track from the memory when the shutter switch is actuated during the detecting operation of the record state detector.

21 Claims, 3 Drawing Sheets

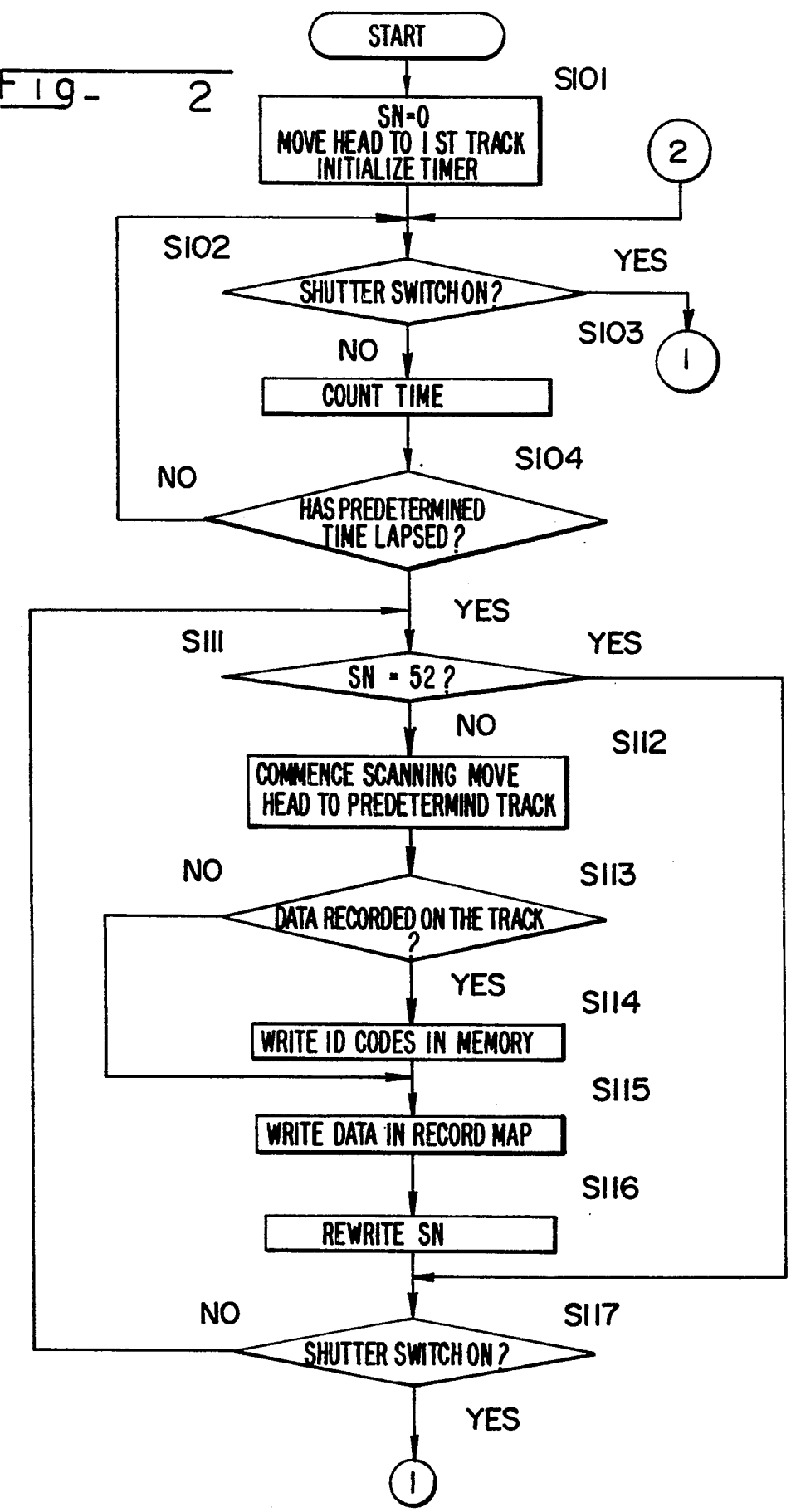

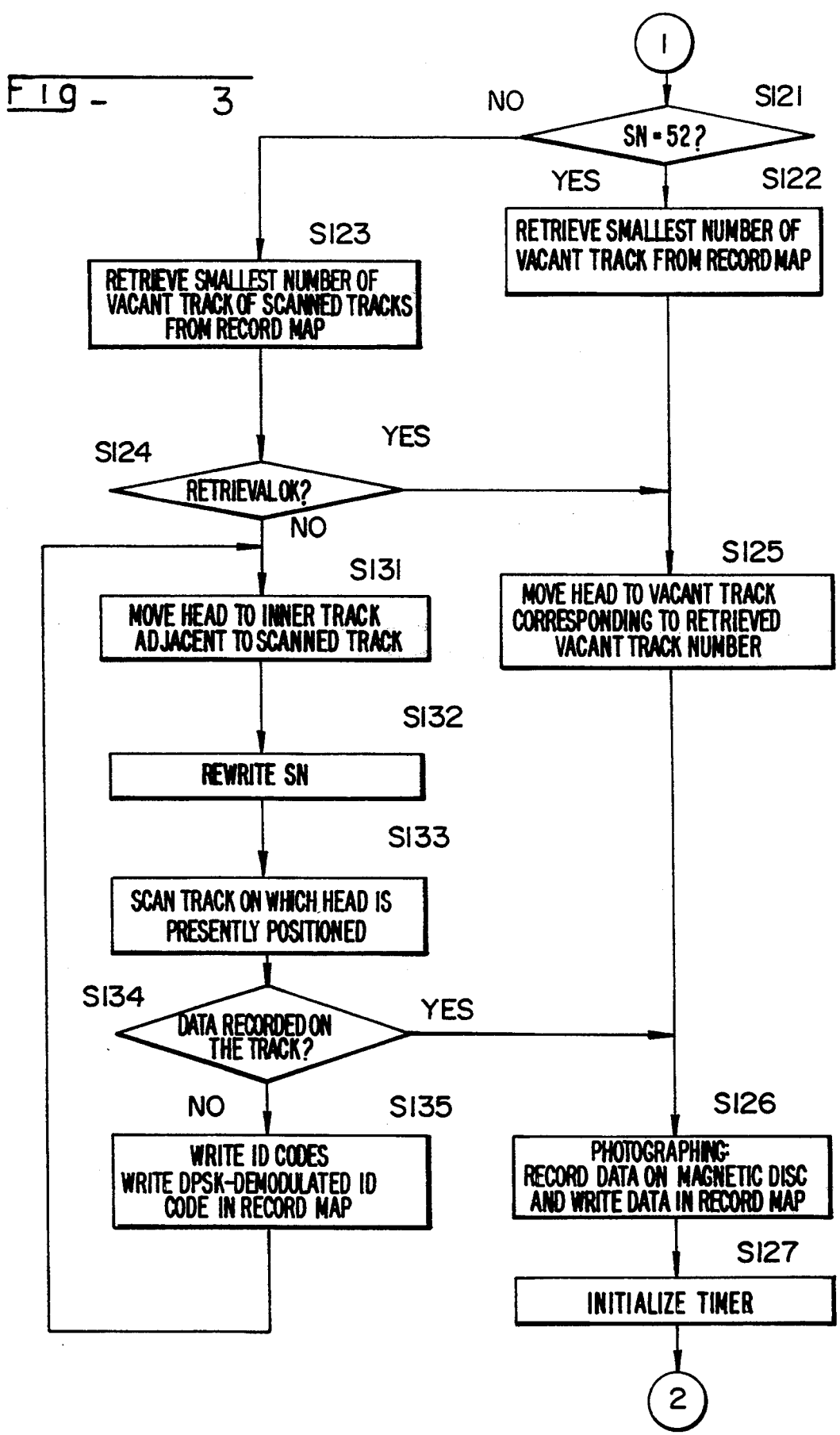

APPARATUS FOR SEARCHING A RECORDING MEDIUM OF AN ELECTRONIC STILL CAMERA

This application is a continuation of application Ser. No. 08/035,966filed Mar. 23, 1993now abandoned.

BACKGROUND OF THE INVENTION

1. Field of the Invention

The present invention relates to an electronic still camera. More precisely, the invention relates to an apparatus for searching a recording medium of an electronic still camera for a vacant track (i.e., empty track) upon recording of a picture.

2. Description of Related Art

In a known electronic still camera, a magnetic disc is used as a recording medium. Generally speaking, the magnetic disc has 50 recording tracks. Upon taking a picture, video signals, etc., are recorded on vacant tracks, the location of which has been determined in advance and stored in a memory. The searching operation for a vacant track is accomplished, for example, by a pre-scanning operation which is effected when the magnetic disc is mounted to the electronic still camera and a desired recording mode is set. Namely, when the recording mode is selected, the recording state (i.e. absence or presence of recording data) of all of the 50 tracks (i.e., first through fiftieth tracks) is successively checked before the video signals, etc., can be recorded. The signals are recorded on a track having the lowest track number, the recording tracks being numbered from the innermost track to the outermost track or vice versa. In another searching system in which pre-scanning is not carried out, when a shutter button is depressed (shutter switch is turned ON), the recording state of the recording track closest to a magnetic head at that moment is first checked. Thereafter, the recording tracks subsequent thereto are successively checked, so that the video signals, etc., can be recorded on a first available vacant track.

In a known search system using the pre-scanning operation, it is necessary to scan all the recording tracks to locate a vacant track. Accordingly, it usually takes a long time to take a picture after the recording mode is set. In the other known search system, in which a pre-scanning operation is not used, the camera is prepared to take a picture immediately after the recording mode is set. However, the recording state of the recording track on which the magnetic head is positioned upon selection of the recording mode must be detected for each photographing operation. If the recording track has data recorded thereon, the magnetic head is then moved to a subsequent recording track to detect the recording state thereof. The detection is continued until a vacant recording track is found. This results in a limited speed for continuous shots.

SUMMARY OF THE INVENTION

The primary object of the present invention is to provide an apparatus for searching a recording medium of an electronic still camera in a manner such that the camera is brought into a position capable of taking a picture as quickly as possible, and to increase the speed at which continuous shots can be obtained.

To achieve the object mentioned above, according to the present invention, there is provided an apparatus for searching a recording medium of an electronic still camera to determine a record state of recording tracks of the recording medium, wherein electric signals are recorded on at least one of the recording tracks of the recording medium in accordance with the actuation of a record starting button, comprising a means for detecting whether each of the recording tracks have electric signals recorded thereon, means for storing the record state of each of the recording tracks detected by the detecting means, a means for interrupting the detecting means when the record starting button is actuated, and means for accessing a vacant recording track in accordance with the record state data stored in the storing means upon interruption of the detecting operation.

According to another aspect of the present invention, there is provided an apparatus for searching a recording medium of an electronic still camera, comprising, a record state detecting means that detects whether electric signals are recorded on respective recording tracks of a recording medium, and stores the detected record states of the respective recording tracks in a memory, release detecting means for detecting an operation of a shutter switch, vacant track retrieving means which suspends the detecting of the record state detecting means and retrieves vacant track from the memory when the shutter switch is actuated during the detecting operation of the record state detecting means.

The present disclosure relates to subject matter contained in Japanese patent application No. HEI 4-97368 (filed on Mar. 25, 1992) which is expressly incorporated herein by reference in its entirety.

BRIEF DESCRIPTION OF THE DRAWINGS

The invention will be described below in detail with reference to the accompanying drawings, in which:

FIG. 2 is a flow chart of a routine for detecting an absence or presence of recording data on a recording track in a recording medium searching apparatus according to the present invention; and, FIG. 3 is a flow chart of a routine for searching a recording medium for a vacant track after a shutter button is depressed (shutter switch is turned ON).

DESCRIPTION OF THE PREFERRED EMBODIMENT

Figure 1:
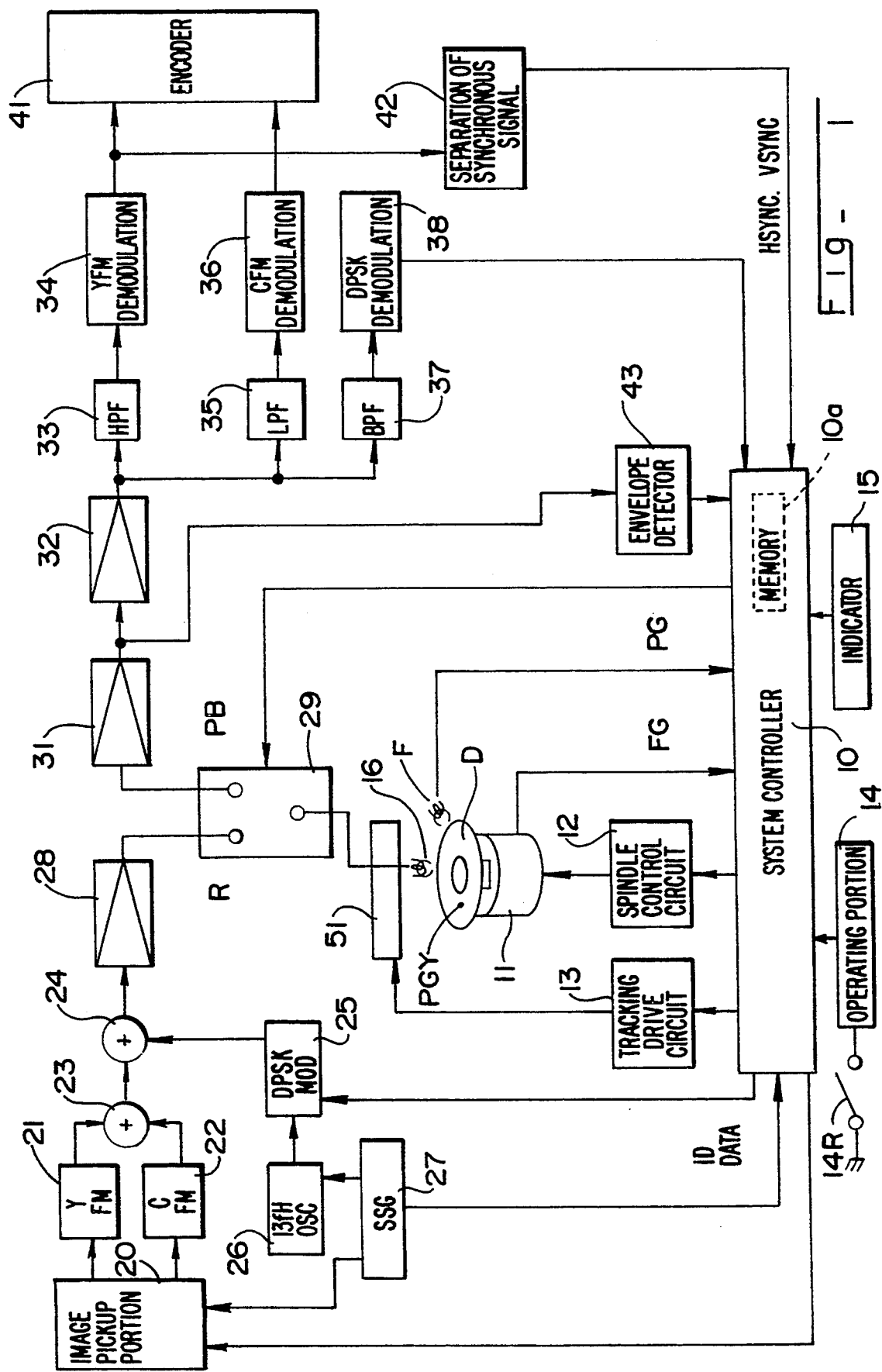
FIG. 1 is a circuit diagram of an electronic still camera having a recording medium searching apparatus according to the present invention.

In an embodiment illustrated in FIG. 1, an electronic still camera has a magnetic disc D as a recording medium. The magnetic disc D has a large number of recording tracks (e.g., 52 tracks) concentrically arranged thereon. A system control circuit (i.e., microcomputer) 10 generically controls the whole apparatus to record picture signals and/or sound signals on respective recording tracks of the magnetic disc D, or to play back the recorded picture signals and/or sound signals.

The system controller 10 includes a memory 10a in which various data including vacant track number data of the magnetic disc D, are stored.

The magnetic disc D is rotated by a spindle motor 11 which is controlled by a spindle control circuit 12. A rotation phase detecting magnetic coil F is provided in the vicinity of the magnetic disc D. The magnetic coil F detects a pulse generating yoke portion PGY (referred to as a PG yoke portion PGY) provided on the magnetic disc D, so that a predetermined number of FG pulses is inputted for each rotation of the magnetic disc D.

The system controller 10 controls the rotation of the spindle motor 11 in accordance with the FG pulse signal to rotate the magnetic disc D at a predetermined speed and phase. A magnetic head 16 is provided to record video signals and/or sound signals onto the magnetic disc D and to play back the same. The magnetic head 16 is controllably moved by an actuator 51, which is driven by a tracking drive circuit 13 to a predetermined recording track of the magnetic disc D. The tracking drive circuit 13 is controlled by the system controller 10.

An operating portion 14 and an indicator 15 are connected to the system controller 10. The operating portion 14 is provided to actuate the electronic still camera and has a shutter switch (e.g., record starting button) 14R for commencing a recording operation and, for example, a switch for selecting the recording track of the magnetic disc D to be reproduced (played-back). Indicator 15 comprises for example, a liquid crystal panel which indicates the track number of the magnetic disc which is being processed.

The video signals are recorded onto the magnetic disc D, as follows:

An image pickup portion 20, having a solid-state image pickup device (CCD), etc., is controlled by the system controller 10 to form an image on the CCD and split the image into a brightness signal and color signal. The brightness and color signals are FM-modulated by a brightness signal FM-modulation circuit 21 and a color signal FM-modulation circuit 22, respectively. The brightness signal FM-modulation circuit 21 and the color signal FM-modulation circuit 22 are connected to an adder 23, so that the FM-modulated brightness and color signals are compounded by the adder 23 to produce a video signal corresponding to a single still picture.

The first adder 23 is connected at an output terminal thereof to an input terminal of a second adder 24 which superimposes the picture signal and a DPSK signal fed from the first adder 23. The second adder 24 is connected to a DPSK modulation circuit 25 in which a DPSK-modulation of carriers fed from a carrier generation circuit 26 is effected in accordance with ID codes. The ID codes include the track numbers of the magnetic disc D and the photographing day, month, year, etc., on which the picture is taken, and are sent from the system controller 10, to thereby produce the DPSK signal. The carriers are generated by the carrier generating circuit 26 in accordance with the output signals of a reference clock generating circuit 27.

The second adder 24 is connected to a recording terminal R of a switch 29 through a recording amplifier 28. The switch 29 is switched by the system controller 10, so that when video signals and/or sound signals are recorded on the magnetic disc D, the switch 29 is moved to a recording position R, and when video signals and/or sound signals recorded on the magnetic disc D are reproduced, the switch 29 is moved to a play-back position PB. Consequently, upon recording, the superimposed video and DPSK signals by the second adder 24 are recorded on a predetermined recording track of the magnetic disc D through the recording amplifier 28 and the magnetic head 16.

The video signals recorded on the magnetic disc D are reproduced as follows:

The play-back position (terminal) PB of switch 29 is connected to a head amplifier 31 which is connected to an automatic gain controlling (AGC) amplifier 32. The AGC amplifier 32 is connected to a brightness signal FM-demodulation circuit 34, a color signal FM-demodulation circuit 36, and a DPSK demodulation circuit 38 through a high-pass filter 33, a low-pass filter 35, and a band-pass filter 37, respectively. The brightness signal FM-demodulation circuit 34 and the color signal FM-demodulation circuit 36 are connected to an encoder 41 which produces video signals, based on the brightness signal and the color signal input thereto from the brightness signal FM-demodulation circuit 34 and the color signal FM-demodulation circuit 36, respectively. The DPSK demodulation circuit 38 is connected to the system controller 10, so that the ID codes can be inputted to the system controller 10 through the DPSK demodulation circuit 38.

A synchronous signal separation circuit 42 is connected to a line between the brightness signal FM-demodulation circuit 34 and the encoder 41 to separate a horizontal synchronous signal component Hsync and a vertical synchronous signal component Vsync from the brightness signal. The horizontal and vertical synchronous signal components Hsync and Vsync are sent to the system controller 10 and are used to control the timing of various operations.

An envelope detector (detecting circuit) 43 which is connected to the system controller 10 is connected to a line between the head amplifier 31 and the AGC amplifier 32, so that the reproduced signals are detected by the envelope detector 43. The output signals thus obtained are fed to the system controller 10. As will be discussed below, the system controller 10 determines the presence or absence of data recorded on the recording tracks of the magnetic disc D, in accordance with the output signals of the envelope detector 43.

FIGS. 2 and 3 show flow charts of a retrieval of a vacant track of the magnetic disc D.

The routine represented by the flow charts shown in FIGS. 2 and 3 is commenced when the magnetic disc D is inserted into the associated electronic still camera and the recording mode is set by the operating portion 14 or when the magnetic disc D is interchanged.

At step S101, a scanned track number SN is set to 0, and the magnetic head 16 is moved to a first track. The "scanned track number SN" refers to the track that has been searched (i.e., scanned) to check the presence or absence of data recorded thereon. Also, at step S101, a timer (to be used in step S103) is initialized.

Thereafter, at step S102, whether the shutter switch 14R is turned ON is checked. If the shutter switch 14R is turned ON, control proceeds to step S121 to retrieve the number of the vacant track stored in a memory 10a of the system controller 10 and to thereby move the magnetic head 16, so that the video signals, etc., are recorded on the vacant track.

Conversely, if the shutter switch 14R is not turned ON, control proceeds to step S103 to effect a counting operation of the timer. Thereafter, whether a predetermined time (e.g., 5 minutes) has elapsed is checked at step S104. During the period of predetermined time period, the operations of steps S102 to S104 are repeated. If the predetermined time (e.g., 5 minutes) has elapsed, control proceeds to step S111 to commence the scanning operation. Namely, if an operation is not carried out within 5 minutes after the recording mode is set, it is assumed that the shutter switch 14R is not going to be turned ON soon thereafter. Consequently, the scanning operation is commenced.

In the illustrated embodiment, the first track, i.e., the outermost recording track is first scanned. Then, subsequent inner recording tracks are successively scanned.

At step S111, whether or not the scanned track number SN is 52 (i.e., SN=52) is checked. In the illustrated embodiment, the magnetic disc D has 52 tracks, of which the 1st to 50th tracks are used to record video signals and sound signals, etc. Data is not recorded on the 51st track. The 52nd track is optionally used as a cue track to record thereon, for example, codes which are used to correctly combine the corresponding video and sound signals upon play-back.

When the operation at step S111 is carried out for the first time, the scanned track number SN is 1 (i.e., SN=1). Accordingly, the operations at steps S112 through S116 are effected to determine whether the track has data recorded thereon. These operations are repeated until the scanned track number SN is 52 (i.e., SN=52).

At step S112, the magnetic head 16 is moved to the start track, which is the first track to be scanned. The number of the start track is identical to the rewritten scanned track number SN plus 1 (the rewriting of the scanned track number is carried out at step S116 discussed below). Note that when the operation at step S112 is accomplished for the first time, the magnetic head 16 is positioned to correspond to the 1st recording track. Accordingly, the magnetic head 16 is not moved.

At step S113, whether the associated track on which the magnetic head 16 is presently positioned has data recorded thereon (i.e., video signals or sound signals) is checked, based on the magnitude of the outputs of the envelope detector 43. If there is data recorded on the track, control proceeds to step S114 to effect the DPSK-demodulation of the ID codes recorded on that track and write the DPSK-demodulated ID codes in the memory 10a of the system controller 10.

Conversely, if there is no data recorded on the track, control skips step S114 and goes to step S115 to write data representing the record state of the track (i.e., presence and absence of the recorded data) obtained at step S113 in a record map, which is provided in the memory 10a. At step S116, the scanned track number SN is rewritten to a value increased by one. Thus, the rewritten scanned track number represents the track number at which scanning has already been completed.

At step S117, whether the shutter switch 14R is turned ON is checked. If the shutter switch 14R is depressed, control proceeds to step 121. Conversely, if the shutter switch 14R is not turned ON, control is returned to step S111 to repeat the operations of steps S112 through S116.

As can be seen from the above discussion, the record states of the 1st to 52nd tracks are successively written in the record map of the memory 10a of the system controller 10. When the determination of the record states of all the tracks is completed, the scanned track number SN at step S111 will be 52. Consequently, steps S112 through S116 are skipped, so that the operations only at steps S111 and S117 are performed. If the shutter switch 14R is turned ON at step S117, control proceeds to step S121 (discussed below) to retrieve a vacant track, so that the video signals, etc., can be recorded on the vacant track.

If the shutter switch 14R is turned ON before the scanning operations at steps S112 through S116 are completed for all the tracks, control proceeds to step S121 from step S117.

When the shutter switch 14R is turned ON, the operation at step S121, and those at steps subsequent thereto, are effected irrespective of the completion of the scanning operation for all of the tracks. First, at step S121, whether the scanned track number SN is 52 is checked. If SN is 52, the scanning operation is completed for all of the tracks. Thereafter, a vacant track having the smallest number is selected from among all the vacant tracks at step S122, in accordance with the record map of the memory 10a of the system controller 10.

Conversely, at step S123, if the scanned track number SN is not 52 (i.e., SN≠52), although there is a track (or tracks) that has not yet been scanned, the vacant track having the smallest number is selected from among the vacant tracks that have been already scanned, in accordance with the record map. Thereafter, whether the vacant track has been located by the operation at step S123 is checked at step S124.

If the vacant track is retrieved from the record map at step S122 or if the retrieval of a vacant track at step S123 is confirmed at step S124, control proceeds to step S125 to move the magnetic head 16 to the vacant track. Thereafter, at step S126, the photographing operation is carried out. The operations at step S126 include shutter releasing, recording of video signals, etc. on the magnetic disc D, and writing in the record map information indication completion of the recording of the video signals, etc., onto the associated track.

Thereafter, the timer is initialized at step S127, and control is returned to step S102 to repeat the above-mentioned operations.

Conversely, if retrieval of a vacant track is not confirmed at step S124, i.e., if a vacant track does not exist among the scanned tracks, the operations at steps S131 through S135 are repeated until a vacant track is located.

Namely, at step S131, the magnetic head 16 is moved to a track adjacent to the most recently scanned track on the inner side thereof. Namely, a track having a track number one greater than the previously scanned track. Thereafter, at step S132, the scanned track number SN is increased by one. Consequently, the track on which the magnetic head 16 is presently positioned is scanned to detect the record state thereof at step S133. At step 134, if it is determined that the track has data recorded thereon, control proceeds to step S135, where the ID codes recorded on the track are DPSK-demodulated and written into the memory 10a of the system controller 10. Also, at step S135, information indicating the completion of data recording onto the track is written in the record map of the memory 10a. Thereafter, control is returned to step S131 to repeat the above-mentioned operations.

If a vacant track is found during the scanning operation as mentioned above, control proceeds to step S126 from step S134. Namely, at step S126, the video signals etc., are recorded on the magnetic disc D as a result of the photographing operation, and the track or tracks on which the video signals etc. are recorded, are written in the record map of the memory. Thereafter, at step 127, the timer is initialized and control is returned to step S102.

Preferably, the memory 10a is comprises of an EEPROM, in which stored data is not automatically erased when a power source is turned OFF or a battery or batteries are exchanged, etc., so that the camera can be brought to a photographing position, in which a picture can be taken, within an extremely short period of time after the power source is reactivated.

As can be understood from the foregoing, according to the present invention, when the shutter button is depressed during the scanning operation, or after the scanning operation has been completed, the vacant track is retrieved with reference to the record map provided in the memory, based on the results of the scanning operations previously carried out. If a vacant track is not among the scanned tracks, the remaining tracks are scanned to locate a vacant track. Consequently, according to the present invention, a camera can be brought into a photographing position in which a picture can be taken, within a shorter period of time than the camera of the prior art, in which the pre-scanning operation is carried out for all of the tracks of the magnetic disc before the photographing operation is commenced.

Furthermore, according to the present invention, when the magnetic disc D is mounted to the electronic still camera or when a picture is taken, no scanning is commenced for a predetermined time (e.g., 5 minutes) thereafter. If the shutter switch is turned ON before the predetermined time lapses, the scanning operation is carried out on a track by track basis to locate a vacant track. Consequently, in an electronic still camera according to the present invention, a picture can be immediately taken and the continuous shot speed can be increased in comparison with the prior art arrangement in which the pre-scanning operation is immediately carried out for all of the tracks of the magnetic disc.

The waiting time provided in the operations at steps S102 through S104 can be used or omitted in accordance with the intended purposes of the camera.

I claim:

1. An apparatus for searching a recording medium of an electronic still camera to determine a record state of a plurality of recording tracks of said recording medium, wherein electric signals are recorded on at least one of said plurality of recording tracks of said recording medium in accordance with a predetermined manipulation of a record button associated with said electronic still camera, comprising:

means for detecting whether or not each of said plurality of recording tracks of said recording medium have electric signals recorded thereon to define a record state of each of said plurality of recording tracks;

means for storing said record state of each of said plurality of recording tracks detected by said detecting means as record state data;

means for interrupting a detecting operation of said detecting means prior to a completion of said detecting operation by said detecting means upon said predetermined manipulation of said record button; and means for accessing a vacant recording track of said recording medium in accordance with said record state data stored in said storing means upon interruption of said detecting means to enable a recording of electric signals to said recording medium.

2. An apparatus for searching a recording medium according to claim 1, wherein said electronic still camera comprises a magnetic head which can be moved to any one of said plurality of recording tracks for detecting of a presence or absence of electric signals by said detecting means.

3. An apparatus for searching a recording medium according to claim 2, wherein said recording medium comprises a rotatable disc, said plurality of recording tracks being formatted concentrically on said disc, and wherein said plurality of recording tracks are numbered from one of an outermost or an innermost track of said disc.

4. An apparatus for searching a recording medium according to claim 3, wherein said vacant track accessing means retrieves a vacant track having a lowest track number when said record state data includes two or more vacant tracks.

5. An apparatus for searching a recording medium according to claim 2, wherein said detecting means resumes detecting whether each of a remaining non-detected recording track has electric signals recorded thereon when data indicating a vacant track is not stored in said storing means.

6. An apparatus for searching a recording medium according to claim 5, wherein said detecting means resumes detecting with a track subsequent to a track last detected before said interruption.

7. An apparatus for searching a recording medium according to claim 2, wherein said electronic still camera comprises means for moving said magnetic head to a vacant track in accordance with said vacant recording track accessing means.

8. An apparatus for searching a recording medium according to claim 7, wherein said magnetic head records said electric signals onto said plurality of recording tracks of said recording medium.

9. An apparatus for searching a recording medium according to claim 8, wherein said storing means stores information indicating a completion of a recording of said electric signals after said magnetic head records electric signals on a predetermined recording track.

10. An apparatus for searching a recording medium according to claim 1, wherein said electronic still camera comprises a detection control means for suspending an operation of said detecting means for a predetermined time when said camera is brought to a recording position in which electric signals can be recorded onto said plurality of recording tracks.

11. An apparatus for searching a recording medium according to claim 10, wherein said record state of said plurality of recording tracks stored in said memory means is cleared when said recording medium is exchanged.

12. An apparatus for searching a recording medium according to claim 11, wherein said detecting means detects said record state of said plurality of recording tracks of said recording medium when said recording medium is exchanged.

13. An apparatus for searching a recording medium of an electronic still camera, comprising:

record state detecting means that detects whether or not electric signals are recorded on respective recording tracks of a recording medium associated with said electronic still camera, said detected record states of said respective recording tracks being stored in a memory;

release detecting means for detecting an operation of a shutter button; and vacant track retrieving means for suspending a detecting operation of said record state detecting means prior to a completion of said detecting operation, and for selecting a vacant track based upon said detected record states stored in said memory when a predetermined manipulation of said shutter button is detected by said release detecting means during said detecting operation of said record state detecting means, so as to enable the recording of electric signals on said selected vacant track of said recording medium prior to said completion of said detecting operation by said record state detecting means.

14. An apparatus for searching a recording medium according to claim 13, further comprising means for suspending said detecting operation of said record state detecting means for a predetermined time when said electronic still camera is set to a recording mode in which a recording can be effected.

15. An apparatus for recording electric signals on a recording medium having a plurality of tracks, comprising:
   means for determining whether electric signals are recorded on each track of said plurality of tracks;
   a memory that stores state data of each track of said plurality of tracks that have been determined by said determining means to be vacant of electric signals; and
   means for interrupting a determining operation being performed by said determining means prior to a completion of said determining operation in response to a predetermined manipulation of a shutter switch to initiate a recording operation, electric signals being recorded on a track that is vacant of electric signals based upon said state data stored in said memory.

16. The apparatus of claim 15, wherein said recording medium comprises a magnetic disk.

17. The apparatus of claim 15, wherein said interrupting means records said electric signals on a vacant track having a lowest vacant track number when said memory stores state data of a plurality of vacant tracks.

18. The apparatus of claim 15, further comprising means for clearing said memory of said state data when said recording medium is removed from said apparatus.

19. The apparatus of claim 15, further comprising means for resuming said detection of electric signals by said determining means when said recording operation is terminated.

20. The apparatus of claim 19, wherein said determining means resumes detecting whether electric signals are recorded on each track of said plurality of tracks with a track subsequent to a track last detected before said interrupting means interrupted said determining means.

21. An apparatus for recording electric signals on a recording medium having a plurality of tracks, comprising:
   means for examining said plurality of tracks of said recording medium to determine an existence of at least one vacant track on said recording medium;
   means for storing data indicating which of said plurality of tracks of said recording medium correspond to said at least one vacant track;
   means for interrupting an examining operation of said examining means prior to a completion of said examining operation by said examining means when a release switch associated with said apparatus is actuated to initiate a recording operation, said interrupting means permitting a signal to be recorded on a vacant track of said recording medium, as indicated by said data stored in said storing means, prior to said completion of said examining operation.

* * * * *

UNITED STATES PATENT AND TRADEMARK OFFICE
CERTIFICATE OF CORRECTION

PATENT NO. : 5,450,255
DATED : September 12, 1995
INVENTOR(S) : Akihiro ARISAKA

It is certified that error appears in the above-indentified patent and that said Letters Patent is hereby corrected as shown below:

At column 7, line 67 (claim 2, line 5), delete "of" (first occurrence).

Signed and Sealed this

Twenty-first Day of May, 1996

Attest:

BRUCE LEHMAN

Attesting Officer     Commissioner of Patents and Trademarks